United States Patent
Someya et al.

(10) Patent No.: US 6,669,181 B2
(45) Date of Patent: Dec. 30, 2003

(54) VIBRATION ISOLATING APPARATUS

(75) Inventors: Katsumi Someya, Yokohama (JP); Shigeki Okai, Yokohama (JP)

(73) Assignees: Bridgestone Corporation, Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/122,338

(22) Filed: Apr. 16, 2002

(65) Prior Publication Data

US 2002/0185797 A1 Dec. 12, 2002

(30) Foreign Application Priority Data

Apr. 17, 2001 (JP) ........................................ 2001-118079

(51) Int. Cl.[7] .............................. F16F 13/06; F16F 13/18; F16F 13/14

(52) U.S. Cl. ..................... 267/140.12; 267/35; 267/122; 267/219

(58) Field of Search ...................... 267/140.12, 140.11, 267/141.2, 219, 35, 122; 248/562, 636, 635, 631; 180/300, 312, 902

(56) References Cited

U.S. PATENT DOCUMENTS

| | | | | |
|---|---|---|---|---|
| 4,728,086 A | * | 3/1988 | Ishiyama et al. | |
| 4,872,650 A | * | 10/1989 | Tabata et al. | |
| 5,370,376 A | * | 12/1994 | Ishiyama | |

FOREIGN PATENT DOCUMENTS

JP    A 7-233848    9/1995

* cited by examiner

Primary Examiner—Douglas C. Butler
(74) Attorney, Agent, or Firm—Oliff & Berridge, PLC (57) ABSTRACT

The vibration isolating apparatus includes, an outer tube, an inner tube disposed at an inner peripheral side of the outer tube, an elastic body disposed between the outer tube and the inner tube, a main fluid chamber which contains a fluid with the elastic body serving as a portion of a partitioning wall of the main fluid chamber and whose internal volume changes due to deformation of the elastic body, a first auxiliary fluid chamber which contains a fluid and a portion of a partitioning wall of the first auxiliary fluid chamber is formed by a diaphragm so as to expand and contract a space between the first auxiliary fluid chamber and the outer tube, a first passage which communicates the main fluid chamber and the first auxiliary fluid chamber, and a second passage which communicates the main fluid chamber and the first auxiliary fluid chamber.

20 Claims, 4 Drawing Sheets

VIBRATION ISOLATING APPARATUS

BACKGROUND OF THE INVENTION

1. Field of the Invention

The present invention relates to a vibration isolating apparatus which prevents vibrations from being transmitted from a member which generates vibrations. This device can be applied to, for example, cases in which the transmission of vibrations from an engine mounted in a vehicle is to be prevented, or the like.

2. Description of the Related Art

As a vibration isolating apparatus, a structure is known which, for example, is disposed as an engine mount between an engine of a vehicle, which is a vibration generating portion, and the vehicle body, which is a vibration receiving portion, and which absorbs the vibrations generated by the engine so as to impede transmission of vibrations to the vehicle body.

Figure 4:
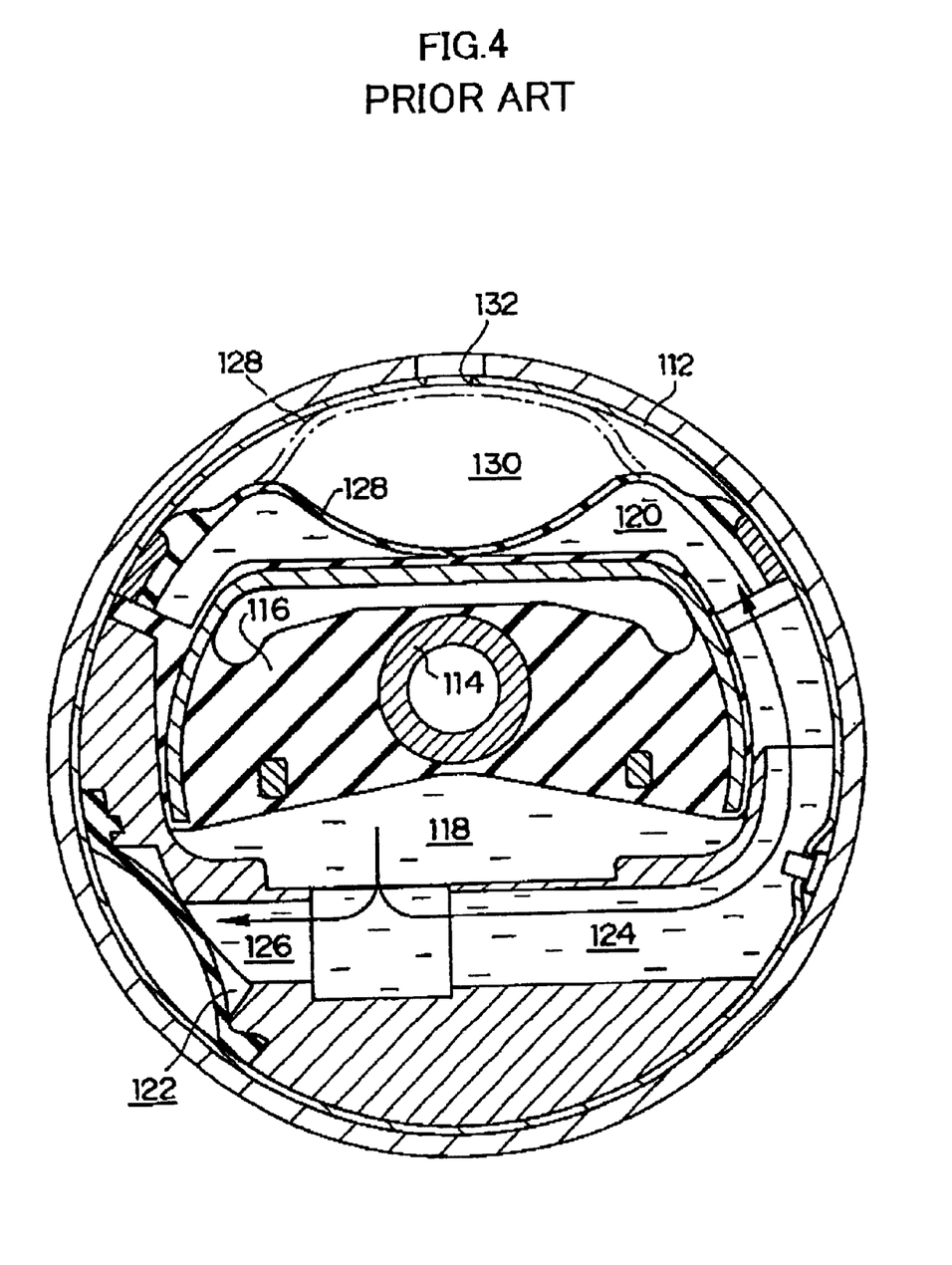
FIG. 4 is a cross-sectional view showing a vibration isolating apparatus relating to the conventional art.

An example of such a vibration isolating apparatus is the bush-type apparatus shown in FIG. 4. This conventional vibration isolating apparatus will be described concretely hereinafter on the basis of FIG. 4.

In the vibration isolating apparatus, an inner tube 114 is disposed, via an elastic body 116, at the inner side of an outer tube 112 which is tubular and forms an outer frame. Further, a main fluid chamber 116, and auxiliary fluid chambers 120, 122, which communicate with the main fluid chamber 118 by orifices 124, 126 which are passages, are formed.

A diaphragm 128, which is an elastic membrane made of rubber, forms a portion of a partitioning wall of the auxiliary fluid chamber 120. The space between the diaphragm 128 and the outer tube 112 is an air chamber 130. A through hole 132 is formed in a portion of the outer tube 112 which portion opposes the diaphragm 128.

Accordingly, when the engines which is mounted to the vibration isolating device, vibrates and vibrations are generated, the vibrations are absorbed or the vibrations are damped by the fluid column resonance or the like of the fluid within the orifices 124, 126 serving as low dynamic springs which communicate the main fluid chamber 118 and the auxiliary fluid chambers 120, 122, respectively. The transmission of vibrations to the vehicle body is thereby impeded.

However, in the above-described vibration isolating apparatus which impedes the transmission of vibrations by utilizing fluid column resonance and lowering the dynamic spring constant, the flow resistance of the orifice through which the fluid flows is set in accordance with the frequency of the vibrations to be absorbed. Thus, the flow resistance depends on the frequency of the vibrations.

Namely, in a conventional vibration isolating apparatus, there are two types of passages which are the orifice 124, which is a passage for absorbing idle vibrations, and the orifice 126, which is a passage for absorbing booming-noise vibrations. The orifices 124, 126 prevent the transmission of vibrations of two frequencies.

SUMMARY OF THE INVENTION

However, vibrations of intermediate frequencies between the idle vibration region and the booming-noise vibration region, which is a higher frequency region than the idle vibration region, are not absorbed in either passage. Thus, there is the drawback that the frequency region between the idle vibration region and the booming-noise vibration region has a high dynamic spring constant, and the vibrations cannot be reduced.

Accordingly, it has been thought to increase the number of passages to decrease the dynamic spring constant in the above-mentioned frequency region. For example, a structure in which two passages are provided for one auxiliary fluid chamber is disclosed in Japanese Patent Application Laid-Open (JP-A) No. 7-233848.

However, in accordance with the structure disclosed in the aforementioned publication, as the peak-shaped frequency characteristic of the dynamic spring constant is shifted and becomes a broader characteristic, vibrations over a wide range of frequencies can be absorbed, but the spring constant of the frequency region between the idle vibration region and the booming-noise vibration region cannot be greatly decreased.

In view of the aforementioned, an object of the present invention is to provide a vibration isolating apparatus which can reduce vibrations even at frequencies between the idle vibration region and the booming-noise vibration region.

A vibration isolating apparatus relating to a first aspect of the present invention comprises: an outer tube which is tubular and which is connected to one of a vibration generating portion and a vibration receiving portion; an inner tube which is disposed at an inner peripheral side of the outer tube and which is connected to another of the vibration generating portion and the vibration receiving portion; an elastic body which is disposed between the outer tube and the inner tube and is elastically deformable; a main fluid chamber which contains a fluid with the elastic body serving as a portion of a partitioning wall of the main fluid chamber, and whose internal volume changes due to deformation of the elastic body; a first auxiliary fluid chamber which contains a fluid, at least a portion of a partitioning wall of the first auxiliary fluid chamber being elastically deformable; a diaphragm forming a portion of the elastically deformable partitioning wall of the first auxiliary fluid chamber, so as to expand and contract a space between the first auxiliary fluid chamber and the outer tube; a first passage which communicates the main fluid chamber and the first auxiliary fluid chamber; and a second passage which communicates the main fluid chamber and the first auxiliary fluid chamber, a passage sectional area of at least a portion of the second passage being smaller than a passage sectional area of the first passage, and a flow resistance of the second passage being smaller than a flow resistance of the first passage, wherein in a state in which internal pressure of the first auxiliary fluid chamber is low and there is little fluid within the first auxiliary fluid chamber, the diaphragm has a configuration which is sunk toward the first auxiliary fluid chamber, and in a state in which the internal pressure of the first auxiliary fluid chamber is high and there is much fluid in the first auxiliary fluid chamber, the diaphragm has a swollen configuration, and as the internal pressure of the first auxiliary fluid chamber rises and fluid flows into the first auxiliary fluid chamber, the diaphragm inverts and deforms into the swollen configuration.

In accordance with this structure, when vibrations are transmitted from the vibration generating portion which is connected to either the outer tube or the inner tube, the elastic body deforms, and the vibrations are damped by the elastic body. As the internal volume of the main fluid chamber changes due to the deformation of the elastic body, the fluid actively flows to the first auxiliary fluid chamber via the first passage. As a result, a change in pressure arises in the fluid within the first passage, and accompanying this change in pressure, the diaphragm, which is at least one portion of the partitioning wall of the first auxiliary fluid chamber, elastically deforms and the first auxiliary fluid chamber expands and contracts.

Namely, when vibrations are transmitted from the vibration generating portion, not only does the elastic body deform, but also, the dynamic spring constant decreases due to the first passage which connects the main fluid chamber and the first auxiliary fluid chamber. The vibrations are absorbed, and it is difficult for vibrations to be transmitted to the vibration receiving portion which is connected to one of the inner tube and the outer tube.

Moreover, not only the first passage, but the second passage as well also communicates with the main fluid chamber and the first auxiliary fluid chamber. The passage sectional area of at least a portion of the second passage is smaller than the passage sectional area of the first passage, and the flow resistance of the second passage is smaller than the flow resistance of the first passage.

Namely, the value of the passage sectional area/passage length, which is a value of the magnitude of the passage sectional area with respect to the passage length, of the second passage is greater than that of the first passage, and the flow resistance of the second passage is less than the flow resistance of the first passage. Vibrations over a wide range of frequencies can thereby be absorbed The passage sectional area of at least a portion of the second passage is smaller than the passage sectional area of the first passage. Thus, when vibrations of a frequency which causes fluid column resonance in the first passage are generated, the fluid in the second passage barely moves back and forth at all, and the vibrations can be reliably absorbed by the fluid column resonance in the first passage.

The diaphragm forms a portion of an elastically deformable partitioning wall of the first auxiliary fluid chamber, and is in a form which expands and contracts the space between the first auxiliary fluid chamber and the outer tube. In a state in which the internal pressure of the first auxiliary fluid chamber is low and there is little fluid within the first auxiliary fluid chamber, the diaphragm has a configuration which is sunk toward the first auxiliary fluid chamber. In a state in which the internal pressure of the first auxiliary fluid chamber is high and there is much fluid within the first auxiliary fluid chamber, the diaphragm has a swollen configuration. As the internal pressure of the first auxiliary fluid chamber rises and fluid flows into the first auxiliary fluid chamber, the diaphragm inverts and deforms into the swollen configuration.

Namely, in the intermediate stage of deformation of the diaphragm, the diaphragm is in a structurally unstable state. Thus, the diaphragm is provided with an inverting function so as to be able to invert between a concave configuration and a convex configuration, and is made to be elastically deformable such that it is easy for the first auxiliary fluid chamber to expand and contract.

As a result, due to the diaphragm inverting due to elastic deformation, the internal pressure of the first auxiliary fluid chamber decreases, and the flow of fluid into the first auxiliary fluid chamber via the second passage can be promoted. Thus, vibrations can be absorbed even more effectively by the second passage in frequency regions other than the resonance region of the first passage. In accordance therewith, vibrations of frequencies in regions other than the resonance region of the first passage are absorbed in the second passage, and vibrations in regions other than the resonance region of the first passage can be reduced.

Further, in the vibration isolating apparatus of the present invention, preferably, further comprising an air chamber, which is provided between the diaphragm of the first auxiliary fluid chamber and the outer tube, and which is sealed.

Due to this structure, the movement of the inversion deformation of the diaphragm is generated by a balance between the rigidity characteristic of the diaphragm, the fluid pressure within the first auxiliary fluid chamber, and the air pressure within the air chamber. Accordingly, by making the air chamber a sealed space and making it easy for the diaphragm to deform and invert, it is easy for the first auxiliary fluid chamber to expand and contract as the diaphragm deforms.

Specifically, if the air chamber is not a closed space and communicates with the atmosphere, when the fluid pressure within the first auxiliary fluid chamber rises, the diaphragm deforms and swells toward the air chamber side, and closely contacts the outer tube side inner wall of the air chamber. Inversion deformation for returning to the original state does not arise until the fluid pressure falls.

In contrast, if the first air chamber is made to be a sealed space, when the fluid pressure within the first auxiliary fluid chamber rises, the air pressure within the air chamber rises as the diaphragm deforms and swells. When a certain pressure is reached, the diaphragm deforms and inverts toward the first auxiliary fluid chamber. However, the diaphragm does not closely contact the inner wall of the outer tube.

As described above, by making the air chamber a sealed space, the fluctuations in the air pressure within the air chamber, which fluctuations accompany the working of the air spring, can be utilized. In this way, the inversion movement of the diaphragm can be promoted, and the spring constant can be greatly decreased.

Moreover, preferably, the second passage has a hole portion which passes through between the main fluid chamber and a position along the first passage.

Due to this structure, merely by providing the small hole portion, which passes through between the main fluid chamber and a position along the first passage so as to form a short-cut, it is possible to form the second passage which commonly uses a portion of the first passage. In this way, it is possible to provide the second passage easily without using new parts for the passage.

As a result, while keeping the manufacturing costs of the vibration isolating apparatus down, vibrations of frequencies between the idle vibration region and the booming-noise vibration region can be absorbed and vibrations can be decrease.

The vibration isolating apparatus of the present invention preferably further comprises a second auxiliary fluid chamber which contains fluid, at least a portion of a partitioning wall of the second auxiliary fluid chamber being elastically deformable.

Further, preferably, the partitioning wall of the second auxiliary fluid chamber is formed by a diaphragm so as to expand and contract a space between the second auxiliary fluid chamber and the outer tube.

Furthermore, the vibration isolating apparatus preferably further comprises a third passage whose resonance frequency is different than resonance frequencies of the first passage and the second passage, the third passage being connected to the second auxiliary fluid chamber.

Moreover, preferably, the second auxiliary fluid chamber communicates with the main fluid chamber due to the first passage and the third passage being connected.

The present invention can be applied to a double-orifice-type vibration isolating apparatus having two passages which are orifices which connect the main fluid chamber and the first and second auxiliary fluid chambers, respectively. Vibrations of an even wider range of frequencies can thereby be reduced even more effectively.

In the vibration isolating apparatus of the present invention, preferably, the diaphragms of the first and second auxiliary fluid chambers are formed by membrane members made of rubber.

By making the diaphragm a membrane member formed of rubber, the diaphragm inverts and deforms even more easily, and even more effective and reliable vibration absorption in frequencies other than the frequency of the resonance region of the first passage is possible.

A vibration isolating apparatus relating to a second aspect of the present invention comprises: an outer tube which is tubular and which is connected to one of an engine and a vehicle body; an inner tube which is disposed at an inner peripheral side of the outer tube and which is connected to another of the engine and the vehicle body; an elastic body which is disposed between the outer tube and the inner tube and is elastically deformable; a main fluid chamber which contains a fluid with the elastic body serving as a portion of a partitioning wall of the main fluid chamber, and whose internal volume changes due to deformation of the elastic body; a first auxiliary fluid chamber which contains a fluid, at least a portion of a partitioning wall of the first auxiliary fluid chamber being elastically deformable; a diaphragm forming a portion of the elastically deformable partitioning wall of the first auxiliary fluid chamber, so as to expand and contract a space between the first auxiliary fluid chamber and the outer tube; a first passage which communicates the main fluid chamber and the first auxiliary fluid chamber; and a second passage which communicates the main fluid chamber and the first auxiliary fluid chamber, a passage sectional area of at least a portion of the second passage being smaller than a passage sectional area of the first passage, and a flow resistance of the second passage being smaller than a flow resistance of the first passage, wherein in a state in which internal pressure of the first auxiliary fluid chamber is low and there is little fluid within the first auxiliary fluid chamber, the diaphragm has a configuration which is sunk toward the first auxiliary fluid chamber, and in a state in which the internal pressure of the first auxiliary fluid chamber is high and there is much fluid in the first auxiliary fluid chamber, the diaphragm has a swollen configuration, and as the internal pressure of the first auxiliary fluid chamber rises and fluid flows into the first auxiliary fluid chamber, the diaphragm inverts and deforms into the swollen configuration.

The vibration isolating apparatus of the present invention preferably further comprises a second auxiliary fluid chamber which contains fluid, and at least a portion of a partitioning wall of the second auxiliary fluid chamber is formed by a diaphragm which is elastically deformable, and the diaphragm is structured so as to expand and contract a space between the second auxiliary fluid chamber and the outer tube.

Further, the vibration isolating apparatus preferably further comprises a third passage whose resonance frequency is different than resonance frequencies of the first passage and the second passage, the third passage being connected to the second auxiliary fluid chamber.

Moreover, preferably, the second auxiliary fluid chamber communicates with the main fluid chamber due to the first passage and the third passage being connected via a connecting passage whose passage sectional area is different than passage sectional areas of the first passage and the third passage.

DESCRIPTION OF THE PREFERRED EMBODIMENTS

Figure 1:
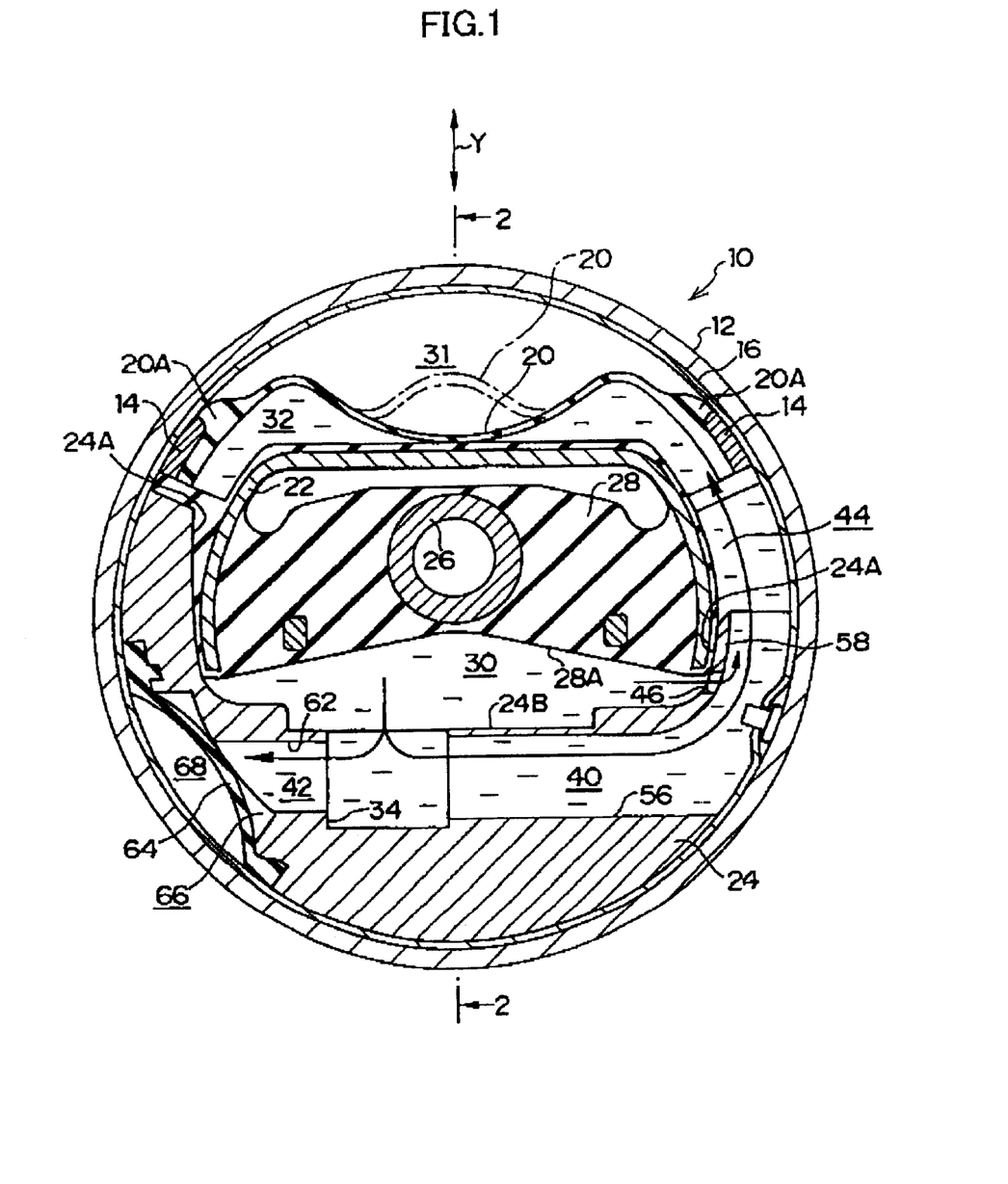
FIG. 1 is a cross-sectional view showing an embodiment of a vibration isolating apparatus relating to the present invention.
Figure 2:
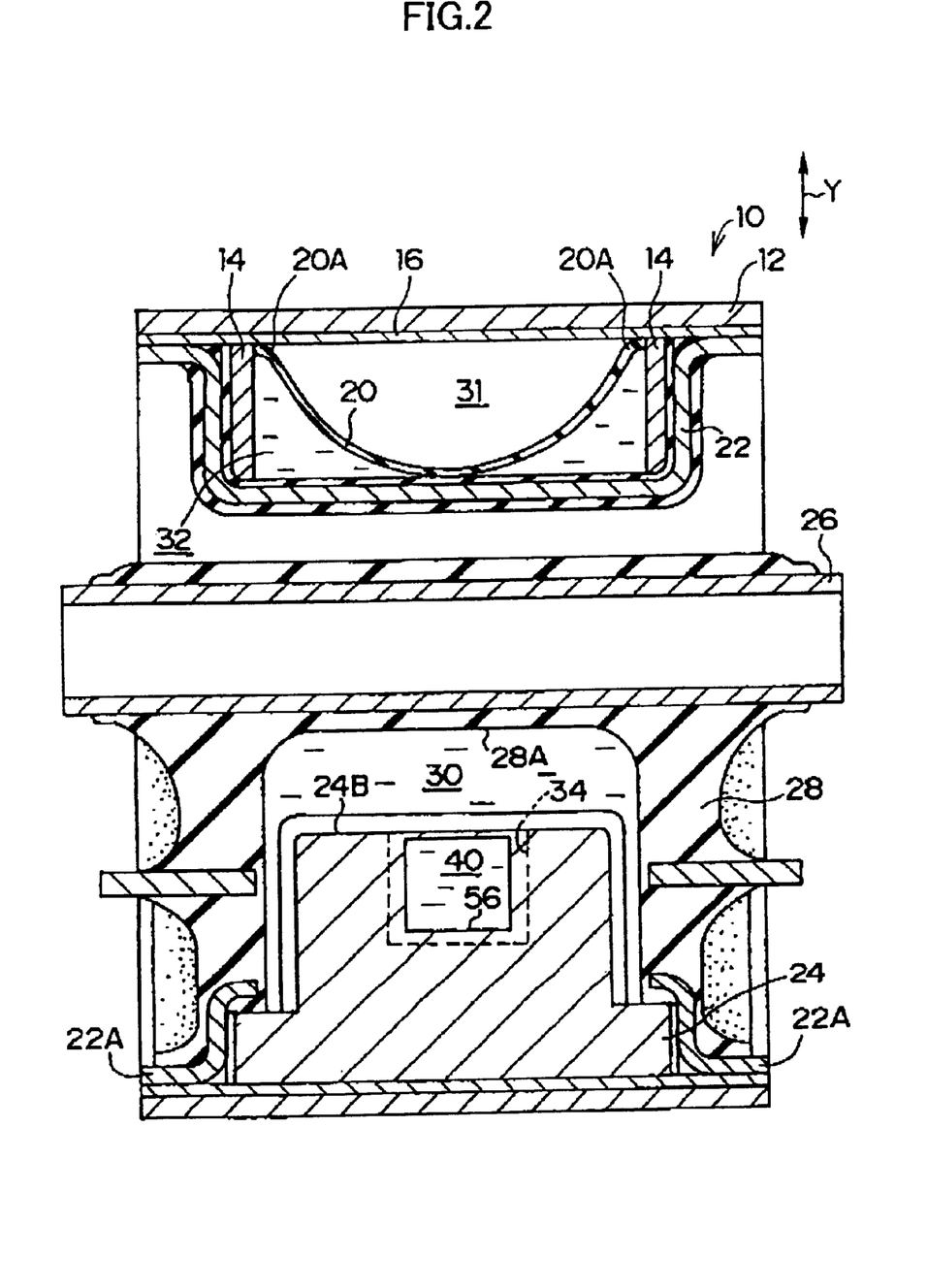
FIG. 2 is a cross-sectional view taken along line 2—2 of FIG. 1.

An embodiment of a vibration isolating apparatus relating to the present invention is illustrated in FIGS. 1 and 2. The present embodiment will be described on the basis of the drawings.

As shown in FIGS. 1 and 2, a bracket 12 for connection to a vehicle body (not shown) is provided at a so-called bush-type vibration isolating apparatus 10. The bracket 12 is formed in a ring shape. An outer tube hardware 16, which is formed in the shape of a hollow cylinder, is disposed so as to be fit in the bracket 12.

An outer peripheral edge 20A, which forms the outer peripheral portion of a first diaphragm 20 which is a thin, elastic membrane made of rubber, is bonded by vulcanization to a metal supporting frame 14 which is formed in a frame shape. By providing the supporting frame 14 at a position near the upper portion of the interior of the outer tube hardware 16, the first diaphragm 20 is disposed near the upper portion, as shown in FIGS. 1 and 2, of the inner peripheral surface of the outer tube hardware 16.

An intermediate tube 22 and an intermediate block 24 are inserted within the outer tube hardware 16, and form partitioning members.

The intermediate block 24 is formed in the shape of a substantially semicircular block as seen from the axial direction of the outer tube hardware 16. As shown in FIG. 1, the outer peripheral surface of the intermediate block 24 closely contacts the inner peripheral surface of the outer tube hardware 16. As shown in FIG. 2, a flange portion 22A is formed at each of the axial direction end portions of the intermediate tube 22. The intermediate block 24 is fit-in between this pair of flange portions 22A near the lower portion side of the intermediate tube 22. Further, the outer peripheral surfaces of the pair of flange portions 22A closely contact the inner peripheral surface of the outer tube hardware 16.

Accordingly, due to the supporting frame 14 being fit-in-between the pair of flange portions 22A near the upper portion side of the intermediate tube 22, the outer peripheral edge 20A of the first diaphragm 20 is supported and fixed between the intermediate tube 22 and the inner peripheral surface side of the upper portion of the outer tube hardware 16.

As shown in FIGS. 1 and 2, no through-hole is formed in the outer tube hardware 16. Thus, the space between the first diaphragm 20 and the inner peripheral surface of the outer tube hardware 16 forms a first air chamber 31 which is a sealed space.

As shown in FIGS. 1 and 2, a portion of the intermediate tube 22, which faces a planar portion 24B which is the top surface of the intermediate block 24, is cut-out and the interior thereof is a cavity. An inner tube hardware 26 which is connected to the engine (not shown) passes through this cavity. The inner tube hardware 26 is disposed parallel to the outer tube hardware 16. An elastic body 28, which is formed from a rubber material or the like, spans between the intermediate tube 22 and the inner tube hardware 26. The inner tube hardware 26 can move relative to the outer tube hardware 16 by this elastic body 28.

Namely, the inner tube hardware 26 is connected to the engine which is a vibration generating portion, and the outer tube hardware 16 is connected, via the bracket 12, to the vehicle body which is a vibration receiving portion.

Further, the elastic body 28 extends to the outer peripheral surface of the intermediate tube 22 between the flange portions 22A. Due to the elastic body 28 extending in this way, portions of the elastic body 28 closely contact inner peripheral arcuate surfaces 24A, which are portions which project from the both end portions of the intermediate block 24 and are formed in arcuate forms. Further, a cut-out portion 28A is formed so as to make the bottom surface of the elastic body 28 concave, at the lower side of the inner tube hardware 26 and at the intermediate portion of the elastic body 28. The space between this cut-out portion 28A and the intermediate block 24 is a main fluid chamber 30.

On the other hand, a first auxiliary fluid chamber 32, which is enclosed by the intermediate tube 22 and the first diaphragm 20, is formed at a position which is between the pair of flange portions 22A of the intermediate tube 22, and which is at the side across the inner tube hardware 26 and a space from the side at which the main fluid chamber 30 is provided. The first diaphragm 20 forms a portion of an elastically deformable partitioning wall of the first auxiliary fluid chamber 32, and expands and contracts the size of the space between the first auxiliary fluid chamber 32 and the outer tube hardware 16.

In a state in which the internal pressure of the first auxiliary fluid chamber 32 is low and there is little fluid within the first auxiliary fluid chamber 32, the first diaphragm 20 is shaped such that the central portion thereof is sunk-in toward the first auxiliary fluid chamber 32 as shown by the solid line in FIG. 1. Conversely, in a state in which the internal pressure of the first auxiliary fluid chamber 32 is high and there is much fluid within the first auxiliary fluid chamber 32, the central portion of the first diaphragm 20 swells out toward the first air chamber 31 as shown by the one-dot chain line in FIG. 1.

A circular hole 34 is formed in the planar portion 24B side of the intermediate block 24. A passage 56 is formed in the intermediate block 24. One end side of the passage 56 opens at the inner periphery of the circular hole 34, and is connected to the circular hole 34, and extends in a direction orthogonal to the surface of the drawing of FIG. 2.

The other end of the passage 56 communicates with one end of a passage 58 which is a groove portion formed along the peripheral direction in the outer periphery of the intermediate block 24. The other end of the passage 58 communicates with the first auxiliary fluid chamber 32.

In this way, the main fluid chamber 30 and the first auxiliary fluid chamber 32 are communicated by the circular hole 34 and the passages 56, 58. An idle orifice 40, which communicates the main fluid chamber 30 and the first auxiliary fluid chamber 32 and which is a restricting passage for absorbing idle vibrations, is formed by the passages 56, 58.

A hole portion 46 is formed in the intermediate block 24 so as to pass through between the main fluid chamber 30 and a position along the idle orifice 40. An intermediate orifice 44, which communicates the main fluid chamber 30 and the first auxiliary fluid chamber 32, is formed by the hole portion 46 and the portion of the idle orifice 40 from the hole portion 46 to the first auxiliary fluid chamber 32. The intermediate orifice 44 is structured such that the passage sectional area of the hole portion 46 shown in FIG. 1 is smaller than that of the idle orifice 40, and the flow resistance of the intermediate orifice 44 is smaller than that of the idle orifice 40, and the intermediate orifice 44 has a different resonance frequency than that of the idle orifice 40.

On the other hand, as shown in FIG. 1, a hole portion 62 for booming-noise, which runs along the radial direction of the circular hole 34 and which is directed in the opposite direction of the passage 56, is formed in the intermediate block 24 so as to be much shorter than the passage 56. A second auxiliary fluid chamber 66, which is formed as an arcuate space, is formed in a portion of the intermediate block 24 which portion corresponds to the opening end of the hole portion 62 for booming-noise. An end portion of the hole portion 62 for booming-noise opens at the second auxiliary fluid chamber 66.

Accordingly, the main fluid chamber 30 and the second auxiliary fluid chamber 66 are communicated by the circular hole 34 and the hole portion 62 for booming-noise. Namely, due to the hole portion 62 for booming-noise being formed to be much shorter than the passage 56, the hole portion 62 for booming-noise absorbs high frequency vibrations. An orifice 42 for booming-noise, which is a restricting passage for absorbing intermediate and low speed booming-noise which are vibrations of a higher frequency than idle vibrations, is formed so as to communicate the main fluid chamber 30 and the second auxiliary fluid chamber 66.

A thin second diaphragm 64, which is made of an elastic member such as rubber or the like, is disposed at the outer peripheral side portion of the intermediate block 24 with respect to the second auxiliary fluid chamber 66, such that the outer peripheral portion of the second diaphragm 64 is nipped between the outer tube hardware 16 and the intermediate block 24. The second diaphragm 64 forms an elastically deformable partitioning wall of the second auxiliary fluid chamber 66. Thus, the space between the second diaphragm 64 and the inner peripheral surface side of the outer tube hardware 16 is a second air chamber 68 which is within the outer tube hardware 16 and in whose interior air is sealed. This second air chamber 68 enables deformation of the second diaphragm 64.

Accordingly, the second diaphragm 64 forms a portion of the partitioning wall of the second auxiliary fluid chamber 66. As shown in FIG. 1, the area of the second diaphragm 64 is smaller than the area of the first diaphragm 20 which forms a portion of the partitioning wall of the first auxiliary fluid chamber 32. Further, the thickness of the second diaphragm 64 is substantially the same as that of the first diaphragm 20. Accordingly, the second diaphragm 64 is more rigid than the first diaphragm 20. Further, a fluid such as ethylene glycol or the like is contained so as to be filled in the main fluid chamber 30, the first auxiliary fluid chamber 32, and the second auxiliary fluid chamber 66.

As described above, in the present embodiment, the main fluid chamber 30 and the first auxiliary fluid chamber 32 are communicated by the idle orifice 40 which is a first passage and the intermediate orifice 44 which is a second passage, which have different resonance frequencies. Further, the main fluid chamber 30 and the second auxiliary fluid chamber 66 are communicated by the orifice 42 for booming-noise whose resonance frequency is different then those of the idle orifice 40 and the intermediate orifice 44.

Thus, when the elastic body 28 deforms and fluid is pushed out from the main fluid chamber 30, the fluid flows into the auxiliary fluid chambers 32, 66 via the orifices 40, 42.

Next, operation of the vibration isolating apparatus 10 relating to the present embodiment will be described.

When the engine, which is connected to the inner tube hardware 26 and mounted to the vibration isolating apparatus 10, is operated, vibrations of the engine mainly along the direction of arrow Y are transmitted to the elastic body 28 via the inner tube hardware 26. The elastic body 28 works as a vibration absorbing main body, and can absorb vibrations due to the damping function based on the internal friction of the elastic body 28.

Further, the fluids within the main fluid chamber 30 and the first auxiliary fluid chamber 32, whose internal volumes change as the elastic body 28 and the first diaphragm 20 deform, flow through the idle orifice 40. Further, the fluids in the main fluid chamber 30 and the second auxiliary fluid chamber 66, whose internal volumes change as the elastic body 28 and the second diaphragm 64 deform, flow through the orifice 42 for booming-noise. Accordingly, the vibration isolating effect can be improved by the damping operation based on the viscous resistance, the fluid column resonance and the like of the flows of fluids generated in these orifice spaces.

Specifically, for example, when the engine is idling or the vehicle speed is 5 km/h or less, idle vibrations (of about 35 Hz) are generated. At this time, fluid moves back-and-forth between the main fluid chamber 30 and the first auxiliary fluid chamber 32 via the idle orifice 40. Within the idle orifice 40, fluid column resonance occurs, the dynamic spring constant decreases, and the idle vibrations are absorbed.

On the other hand, when the vehicle is traveling at a high speed of, for example, 70 to 80 km/h or more, intermediate and low speed booming-noise (of about 95 Hz), which are vibrations having a high frequency and a small amplitude, are generated. At this time, the change in the pressure within the main fluid chamber 30, which change is based on the generated engine vibrations, is transmitted to the fluid within the orifice 42 for booming-noise which communicates the main fluid chamber 30 and the second auxiliary fluid chamber 66. Within the orifice 42 for booming-noise which is short, fluid column resonance is generated and the dynamic spring constant decreases, and the booming-noise generated in accordance with this change in pressure are absorbed.

In this way, the two orifices 40, 42, which communicate the main fluid chamber 30 and the auxiliary fluid chambers 32, 66 and which can reduce vibrations, can reduce vibrations of frequencies of two levels which differ from one another.

Moreover, the main fluid chamber 30 and the first auxiliary fluid chamber 32 are connected and communicate with one another not only through the idle orifice 40, but also through the intermediate orifice 44 which has the hole portion 46 communicating the main fluid chamber 30 and a position along the idle orifice 40, and which commonly uses a portion of the idle orifice 40. The passage sectional area of the hole portion 46, which is a portion of the intermediate orifice 44, is smaller than the passage sectional area of the idle orifice 40, and the flow resistance of the intermediate orifice 44 is smaller than the flow resistance of the idle orifice 40.

Namely, the value of the passage sectional area/passage length, which is a value of the magnitude of the passage sectional area with respect to the passage length, of the intermediate orifice 44 is greater than that of the idle orifice 40, and the flow resistance of the intermediate orifice 44 is less than the flow resistance of the idle orifice 40. Vibrations over a wide range of frequencies can thereby be absorbed.

The passage sectional area of the hole portion 46, which is a portion of the intermediate orifice 44, is smaller than the passage sectional area of the idle orifice 40. Thus, when vibrations of a frequency which causes fluid column resonance in the idle orifice 40 are generated, the fluid hardly moves back-and-forth to the intermediate orifice 44 at all, and the vibrations can be reliably absorbed by the fluid column resonance in the idle orifice 40.

Moreover, the passage sectional area and the passage length of the intermediate orifice 44 can be appropriately set within the aforementioned ranges. However, when an attempt is made to suppress the dynamic spring constant in an resonance region of the frequency region which is a higher frequency than the idle vibration region and lower than the booming-noise vibration region, the value of the passage sectional area/passage length of the intermediate orifice 44 can be set to be, for example, 1.1 to 2.0 times than that of the idle orifice 40, and can preferably be set to be 1.2 to 1.8 times than that of the idle orifice 40.

Similarly, the passage sectional area of the intermediate orifice 44 can be set appropriately. However, the effects of the present embodiment can be obtained even more reliably if the passage sectional area of the intermediate orifice 44 is set to, for example, 50% or less, and preferably 30% or less, of the passage sectional area of the idle orifice 40.

The intermediate orifice 44 commonly uses a portion of the idle orifice 40. Thus, the intermediate orifice 44 can be formed merely by providing the hole portion 46 which communicates the main fluid chamber 30 and a position along the idle orifice 40 so as to form a short-cut. In this way, the intermediate orifice 44 can be provided simply without using new parts for passages. As a result, not only can vibrations of frequencies in the frequency region higher than the idle vibration region and lower than the booming-noise region can be absorbed and vibrations can be reduced, but also, the manufacturing costs of the vibration isolating apparatus 10 can be kept down.

In the present embodiment, the first diaphragm 20, which is a membrane member formed from rubber, forms an elastically deformable partitioning wall of the first auxiliary fluid chamber 32 in a manner such that the first air chamber 31 between the first auxiliary fluid chamber 32 and the outer tube hardware 16 can expand and contract.

Further, in a state in which the internal pressure of the first auxiliary fluid chamber 32 is low and there is little fluid within the first auxiliary fluid chamber 32, the central portion of the first diaphragm 20 is shaped so as to be sunk-in toward the first auxiliary fluid chamber 32 as shown by the solid line in FIG. 1. When the first diaphragm 20 swells as the internal pressure of the first auxiliary fluid chamber 32 rises and fluid flows into the first auxiliary fluid chamber 32, the first diaphragm 20 inverts and elastically deforms in a swelled shape. In this way, in a state in which the internal pressure of the first auxiliary fluid chamber 32 is high and there is much fluid within the first auxiliary fluid chamber 32, the central portion of the first diaphragm 20 has the swollen shape shown by the one-dot chain line in FIG. 1.

Accordingly, due to the first diaphragm 20 inverting due to this elastic deformation, the internal pressure of the first auxiliary fluid chamber 32 falls, and the flow of fluid into the first auxiliary fluid chamber 32 through the intermediate orifice 44 can be promoted. Thus, even more effective vibration absorption is possible in the frequency region other than the resonance region of the idle orifice 40.

When the first auxiliary fluid chamber 32 changes from a state in which the internal pressure thereof is high and there is much fluid therein to a state in which the internal pressure thereof is low and there is little fluid therein, the first diaphragm 20 inverts in a manner opposite to that described above.

In the present embodiment, there is no through-hole 132 which passes through the outer tube 112 and communicates the interior and exterior thereof, as in the conventional art shown in FIG. 4. Thus, the first air chamber 31 between the first diaphragm 20 and the outer tube hardware 16 is a sealed space.

Namely, the movement of the inversion deformation of the first diaphragm 20 is generated by a balance between the rigidity characteristic of the first diaphragm 20, the fluid pressure within the first auxiliary fluid chamber 32, and the air pressure within the first air chamber 31. By making the first air chamber 31 a sealed space and making it easy for the first diaphragm 20 to deform and invert, it is easy for the first auxiliary fluid chamber 32 to expand and contract as the first diaphragm 20 deforms.

Specifically, if the air chamber 130 is not a sealed space and communicates with the atmosphere as shown in FIG. 4, when the fluid pressure within the auxiliary fluid chamber 120 rises, the diaphragm 128 deforms and swells toward the air chamber 130 side, and closely contacts the outer tube 112 side inner wall of the air chamber 130 in the form shown by the one-dot chain line in FIG. 4. Inversion deformation for returning to the original state does not arise until the fluid pressure drops.

In contrast, if the first air chamber 31 is made to be a sealed space as shown in FIG. 1, when the fluid pressure within the first auxiliary fluid chamber 32 rises, the air pressure within the first air chamber 31 rises as the first diaphragm 20 deforms and swells. Here, when a certain pressure is reached, the first diaphragm 20 deforms and inverts toward the first auxiliary fluid chamber 32 side. However, the first diaphragm 20 is in the state shown by the one-dot chain line in FIG. 1, and does not closely contact the inner wall of the outer tube hardware 16.

As described above, the inversion deformation of the first diaphragm 20 can be made to occur more easily due to the action of the air spring. As a result, the first auxiliary air chamber 32 can expand and contract even more reliably, and more reliable vibration absorption in the frequency regions other than the resonance region of the idle orifice 40 can be achieved.

Figure 3:
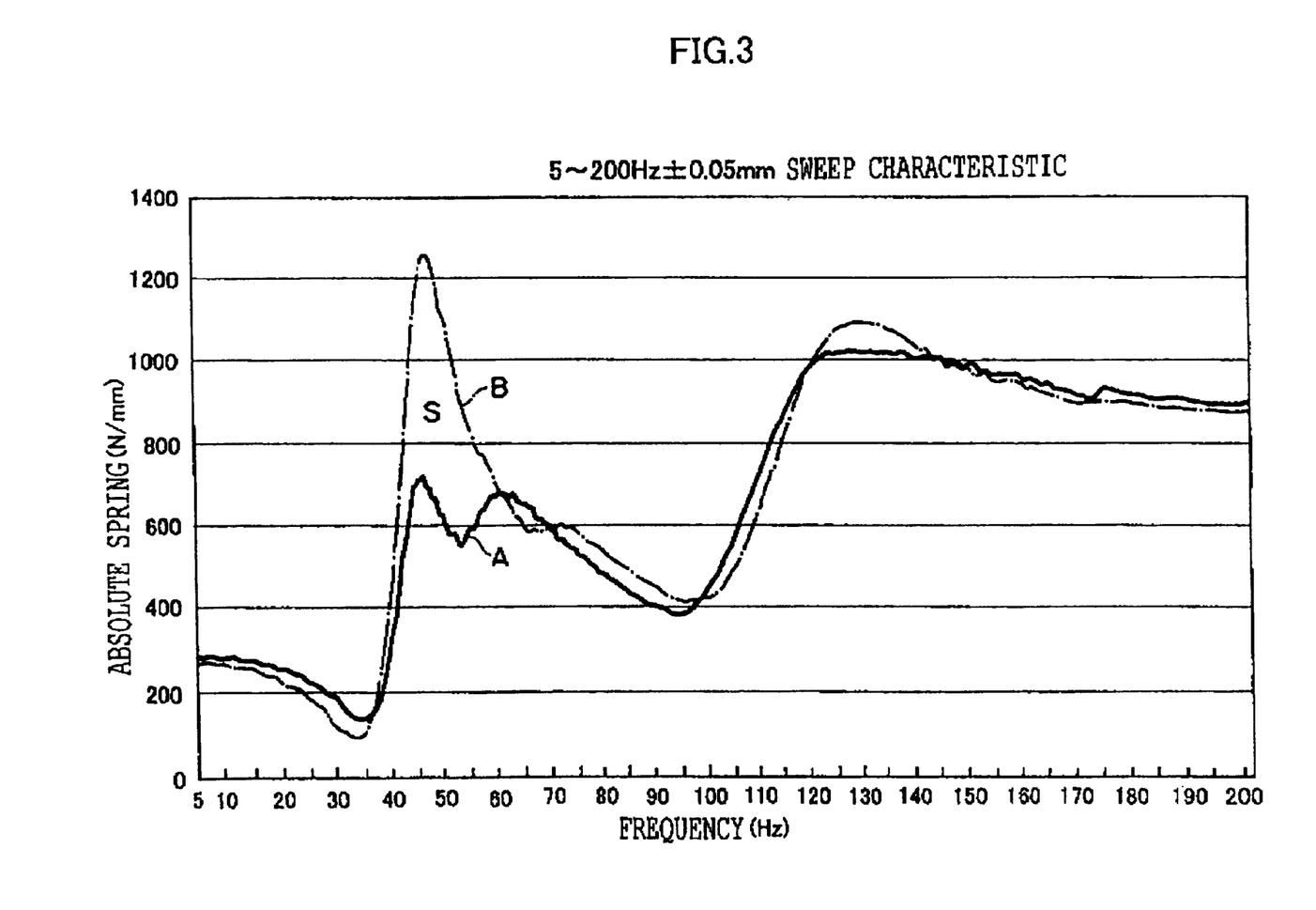
FIG. 3 is a graph of a frequency characteristic of an absolute spring.

On the other hand, by using a structure in which the sealed first air chamber 31 and the hole portion 46 are combined as in the first embodiment, the characteristic shown in the graph of the frequency characteristic of the absolute spring (dynamic spring constant) shown in FIG. 3 is achieved. Namely, as compared with the characteristic of a conventional vibration isolating apparatus (a structure which has two passages and in which the air chamber is opened such that the inversion phenomenon of the diaphragm is not involved) shown by characteristic curve B, the characteristic of the vibration isolating apparatus 10 of the present embodiment shown by characteristic curve A is such that, at frequencies which the dynamic spring constant of the idle orifice 40 rises but the fluid cannot flow within the booming-noise orifice 42 because of the high rigidity of the second diaphragm 64, i.e., are in a range of from about 40 Hz to about 60 Hz, the absolute spring is reduced by a magnitude expressed by region S, and vibrations are absorbed.

Other than making the first air chamber 31 a sealed space as described above, the same effects can be obtained by adjusting the rigidity or the configuration of the like of the first diaphragm 20 itself to make it easier for the first diaphragm 20 to invert and deform.

In the present embodiment, the two auxiliary fluid chambers 32, 66 are provided which communicate with the main fluid chamber 30 by the orifices 40, 42 which are passages having different resonance frequencies. Thus, the present invention can be applied to a double-orifice-type vibration isolating apparatus having these orifices 40, 42 which connect the two auxiliary fluid chambers 32, 66 and the fluid chamber 30. As a result, in the present embodiment, vibrations can be appropriately absorbed even in a wide range of frequencies, and vibrations of a wide range of frequencies can be reduced.

Moreover, in the present embodiment, the object is the isolation of vibrations of an engine mounted in a vehicle. However, the vibration isolating apparatus of the present invention may of course be used for other applications, and the configuration and the like thereof are not limited to those of the embodiment.

The above-described present embodiment does not have a structure in which it is possible to switch between orifices by a switching valve such as a rotor or the like. However, a structure may be used in which a rotor is rotated by an actuator such as a motor or the like to switch between orifices.

As a result of the above-described structure, the vibration isolating apparatus of the present invention can reduce vibrations even of frequencies higher than the idle vibration region and lower than the booming-noise region.

What is claimed is:

1. A vibration isolating apparatus comprising:

an outer tube which is tubular and which is connected to one of a vibration generating portion and a vibration receiving portion;

an inner tube which is disposed at an inner peripheral side of the outer tube and which is connected to another of the vibration generating portion and the vibration receiving portion;

an elastic body which is disposed between the outer tube and the inner tube and is elastically deformable;

a main fluid chamber which contains a fluid with the elastic body serving as a portion of a partitioning wall of the main fluid chamber, and whose internal volume changes due to deformation of the elastic body;

a first auxiliary fluid chamber which contains a fluid, at least a portion of a partitioning wall of the first auxiliary fluid chamber being elastically deformable;

a diaphragm forming a portion of the elastically deformable partitioning wall of the first auxiliary fluid chamber, so as to expand and contract a space between the first auxiliary fluid chamber and the outer tube;

a first passage which communicates the main fluid chamber and the first auxiliary fluid chamber; and a second passage which communicates the main fluid chamber and the first auxiliary fluid chamber, a passage sectional area of at least a portion of the second passage being smaller than a passage sectional area of the first passage, and a flow resistance of the second passage being smaller than a flow resistance of the first passage, wherein in a state in which internal pressure of the first auxiliary fluid chamber is low and there is little fluid within the first auxiliary fluid chamber, the diaphragm has a configuration which is sunk toward the first auxiliary fluid chamber, and in a state in which the internal pressure of the first auxiliary fluid chamber is high and there is much fluid in the first auxiliary fluid chamber, the diaphragm has a swollen configuration, and as the internal pressure of the first auxiliary fluid chamber rises and fluid flows into the first auxiliary fluid chamber, the diaphragm inverts and deforms into the swollen configuration.

2. A vibration isolating apparatus according to claim 1, further comprising an air chamber, which is provided between the diaphragm of the first auxiliary fluid chamber and the outer tube, and which is sealed.

3. A vibration isolating apparatus according to claim 2, wherein the second passage has a hole portion which passes through between the main fluid chamber and a position along the first passage.

4. A vibration isolating apparatus according to claim 3, further comprising a second auxiliary fluid chamber which contains fluid, at least a portion of a partitioning wall of the second auxiliary fluid chamber being elastically deformable.

5. A vibration isolating apparatus according to claim 4, wherein the partitioning wall of the second auxiliary fluid chamber is formed by a diaphragm so as to expand and contract a space between the second auxiliary fluid chamber and the outer tube.

6. A vibration isolating apparatus according to claim 5, further comprising a third passage whose resonance frequency is different than resonance frequencies of the first passage and the second passage, the third passage being connected to the second auxiliary fluid chamber.

7. A vibration isolating apparatus according to claim 6, wherein the second auxiliary fluid chamber communicates with the main fluid chamber due to the first passage and the third passage being connected.

8. A vibration isolating apparatus according to claim 7, wherein the third passage is connected to the first passage via a connecting passage whose passage sectional area is different than passage sectional areas of the first passage and the third passage.

9. A vibration isolating apparatus according to claim 8, wherein the diaphragm of the second auxiliary fluid chamber is formed so as to be more rigid than the diaphragm of the first auxiliary fluid chamber.

10. A vibration isolating apparatus according to claim 8, wherein the diaphragm of the second auxiliary fluid chamber is formed to be more rigid than the diaphragm of the first auxiliary fluid chamber by having a thickness which is substantially equal to a thickness of the diaphragm of the first auxiliary fluid chamber and an area which is smaller than an area of the diaphragm of the first auxiliary fluid chamber.

11. A vibration isolating apparatus according to claim 9, wherein a length of the third passage is shorter than a length of the first passage.

12. A vibration isolating apparatus according to claim 11, wherein the diaphragms of the first and second auxiliary fluid chambers are formed by membrane members made of rubber.

13. A vibration isolating apparatus according to claim 11, wherein the second auxiliary fluid chamber absorbs vibrations of frequencies higher than frequencies of vibrations absorbed by the first auxiliary fluid chamber.

14. A vibration isolating apparatus comprising:
- an outer tube which is tubular and which is connected to one of an engine and a vehicle body;
- an inner tube which is disposed at an inner peripheral side of the outer tube and which is connected to another of the engine and the vehicle body;
- an elastic body which is disposed between the outer tube and the inner tube and is elastically deformable;
- a main fluid chamber which contains a fluid with the elastic body serving as a portion of a partitioning wall of the main fluid chamber, and whose internal volume changes due to deformation of the elastic body;
- a first auxiliary fluid chamber which contains a fluid, at least a portion of a partitioning wall of the first auxiliary fluid chamber being elastically deformable;
- a diaphragm forming a portion of the elastically deformable partitioning wall of the first auxiliary fluid chamber, so as to expand and contract a space between the first auxiliary fluid chamber and the outer tube;
- a first passage which communicates the main fluid chamber and the first auxiliary fluid chamber; and
- a second passage which communicates the main fluid chamber and the first auxiliary fluid chamber, a passage sectional area of at least a portion of the second passage being smaller than a passage sectional area of the first passage, and a flow resistance of the second passage being smaller than a flow resistance of the first passage, wherein in a state in which internal pressure of the first auxiliary fluid chamber is low and there is little fluid within the first auxiliary fluid chamber, the diaphragm has a configuration which is sunk toward the first auxiliary fluid chamber, and in a state in which the internal pressure of the first auxiliary fluid chamber is high and there is much fluid in the first auxiliary fluid chamber, the diaphragm has a swollen configuration, and as the internal pressure of the first auxiliary fluid chamber rises and fluid flows into the first auxiliary fluid chamber, the diaphragm inverts and deforms into the swollen configuration.

15. A vibration isolating apparatus according to claim 14, further comprising an air chamber, which is provided between the diaphragm of the first auxiliary fluid chamber and the outer tube, and which is sealed.

16. A vibration isolating apparatus according to claim 15, wherein the second passage has a hole portion which passes through between the main fluid chamber and a position along the first passage.

17. A vibration isolating apparatus according to claim 16, further comprising a second auxiliary fluid chamber which contains fluid, and at least a portion of a partitioning wall of the second auxiliary fluid chamber is formed by a diaphragm which is elastically deformable, and the diaphragm is structured so as to expand and contract a space between the second auxiliary fluid chamber and the outer tube.

18. A vibration isolating apparatus according to claim 17, further comprising a third passage whose resonance frequency is different than resonance frequencies of the first passage and the second passage, the third passage being connected to the second auxiliary fluid chamber.

19. A vibration isolating apparatus according to claim 18, wherein the second auxiliary fluid chamber communicates with the main fluid chamber due to the first passage and the third passage being connected via a connecting passage whose passage sectional area is different than passage sectional areas of the first passage and the third passage.

20. A vibration isolating apparatus according to claim 19, wherein a length of the third passage is shorter than a length of the first passage.

* * * * *